Nov. 1, 1949   H. R. JOHNSON   2,486,852
MODEL AIRPLANE
Original Filed Feb. 16, 1940
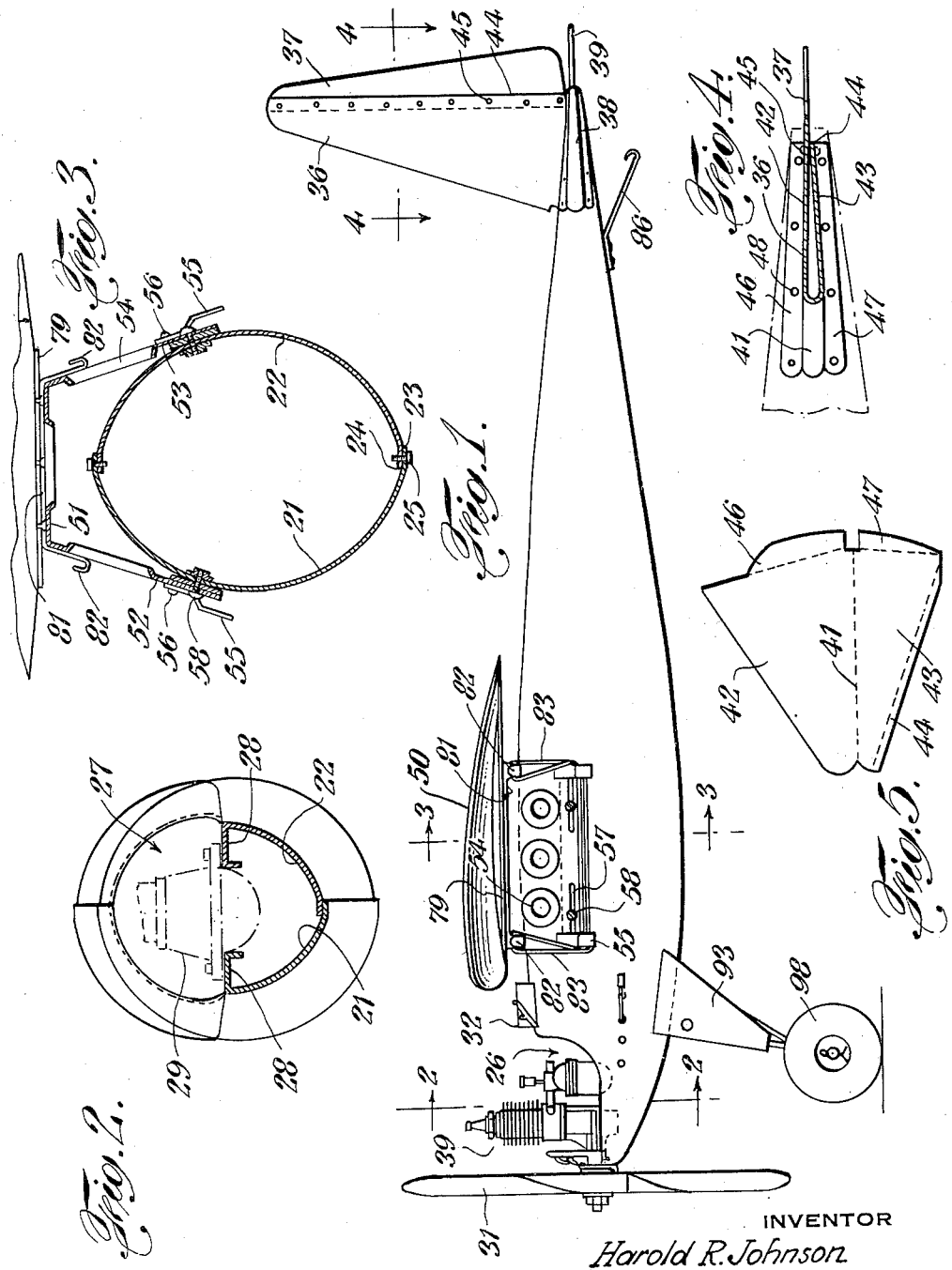
INVENTOR
Harold R. Johnson
BY
M. Theodore Simmons
ATTORNEY Patented Nov. 1, 1949

2,486,852

UNITED STATES PATENT OFFICE 2,486,852

MODEL AIRPLANE

Harold R. Johnson, Bayside, N. Y.

Original application February 16, 1940, Serial No. 319,246. Divided and this application May 1, 1944, Serial No. 533,573

6 Claims. (Cl. 46—76)

1

My invention relates to model airplanes, particularly to the type marketed as a kit of prefabricated parts for assembly by the purchaser, and especially to the fuselage and empennage portions of such model airplanes.

This application is a division of my co-pending application Serial No. 319,246, filed February 16, 1940, now Patent 2,347,689.

Airplane models of this general character, as heretofore marketed, have had a great many disadvantages, among which may be noted that the purchaser has been furnished raw materials out of which the parts of the airplane are to be fashioned by hand, thus requiring a great deal of time, labor and skill in order to produce a flyable airplane model. Even when some prefabricated parts have been furnished for assembly into an airplane model, the assembled structures have been frail and easily broken or subject to serious damage from even slight accidents, all requiring extensive repairs and replacements before the model is again ready for use.

Also, a few attempts have been made in the past to produce a satisfactory all metal airplane model, but those models have been difficult to assemble accurately, have been heavy, have been subject to irreparable breakage when accidents occur, and have generally been unsatisfactory.

It is one object of my invention to provide an all metal airplane model in which the parts, and especially the fuselage, the wing mount and the tail units thereof are of improved design and construction.

It is another object of my invention to provide an all metal airplane model in which certain parts are pre-formed and other parts are readily formed, and all are assembled with accuracy and with a minimum of labor and equipment to assure a durable and successful flying model.

It is another object of my invention to provide a construction of airplane model in which the wing may be readily adjusted in accordance with the requirements of the particular model or operator thereof.

It is another object of my invention to provide an airplane model that will withstand extraordinary shocks, strains and stresses due to accidents in connection with operations and landings thereof, or otherwise.

It is another object of my invention to provide an airplane model in which damages due to accidents or otherwise are confined to a minimum and are easily repairable.

Other and further objects of my invention will

2 be apparent from this specification taken in conjunction with the accompanying drawings, in which—

Figure 1 is a side elevation of a completely assembled airplane model according to my invention;

Fig. 2 is a vertical section on the line 2—2 of Fig. 1, in enlarged detail and parts being omitted for facility of illustration;

Fig. 3 is a vertical section on the line 3—3 of Fig. 1, in enlarged detail and parts being omitted for facility of illustration;

Fig. 4 is a fragmentary cross section on the line 4—4 of Fig. 1, also in enlarged detail; and Fig. 5 is a plan view of the blank from which each of the tail units is formed.

In carrying out my invention, the fuselage is made of two metal half shells which are attached to each other along the longitudinal center line, and to which are attached the necessary vertical and horizontal tail surface units, each formed from one piece of metal, and the adjustable wing mounting truss, also formed from one piece of metal. The fuselage shells are shaped at the nose end of the plane to form an engine mount, and the fuselage requires no internal bracing anywhere therein. The tail surface units are formed from a single piece of metal to provide both rigid stabilizing surfaces and also flexible control surfaces, as well as mounting flanges therefor. All the parts are preferably formed of aluminum, aluminum alloys, or any other light weight metal.

The airplane model is also designed for the use of a suitable lifting or supporting wing, and a shock-proof undercarriage, but these elements are the subject of other co-pending applications, and hence are only generally referred to herein.

Referring to the drawings, the fuselage consists of two shells 21 and 22, which may be of any suitable shape. Preferably, in cross section, the shell sections are segments of a circle terminating in flattened edge surfaces 23 and 24, respectively, which edge portions extend the length of the fuselage. The resultant somewhat elliptical shape is preserved throughout the length of the fuselage, but the area varies by reason of the fact that the fuselage has its greatest height and width in the region approximately that of the section line 3—3, or beneath the wing, and the fuselage tapers forwardly to the nose and rearwardly to the tail end in accordance with stream-lining and aerodynamic principles which are well understood.

When the shells are to be assembled into the complete fuselage, they are brought together as indicated in Fig. 3, with the flattened edge portions 23 and 24 overlapping. The overlapped edge portions are fastened together in any suitable manner, screws being preferred, as indicated at 25. These screws are spaced along both the upper and lower overlapped seams in sufficient quantity to secure a smooth, tight joint and a rigid construction.

At the forward end of the fuselage, the top halves of the shells 21 and 22 are cut away, as indicated at 26, to leave an opening 27 providing access to the interior of the fuselage, the opening also extending to the front end of the fuselage. The opening is defined by an inturned flange, indicated at 28, which in the horizontal front part thereof forms a shelf or support upon which engine 29 is suitably mounted. Any suitable power plant may be used to drive the forward thrust propeller 31, which is mounted upon the shaft thereof, so that no description is made in detail of the illustrated motor or its mounting. The motor is desirably of the internal combustion engine type and makes use of an automatic timer 32 for controlling the duration of the flight, but other controls may be used, such as radio operated controls. Likewise, the mounting of the dry cell batteries on the interior of the fuselage is not shown, this being a matter left to the discretion and convenience of the assembler.

The above described construction of fuselage formed of two metallic shells, shaped and secured together as described, produces a strong, wholly enclosed, light weight hull, requiring no internal bracing for models of ordinary size. I have found that internal bracing of the fuselage is not necessary in models designed for wing spreads of five and six feet. Of course, it is contemplated that internal bracing may be used in the fuselage if desired, and it is apparent that the same may be readily secured thereto by screws or rivets; but the addition of any such bracing will have to be taken into account in determining such matters as location of center of gravity, lift and power requirements, etc.

The airplane model according to this invention also is provided with all the normal rear control surfaces consisting of vertical fin 36, rudder 37, and on each side of the fuselage, horizontal stabilizer 38 and elevator 39, all in simulation of true airfoil sections.

The vertical fin and rudder is formed of one piece of metal, as is each of the horizontal stabilizers and elevators, and each of these control units is separately attached to the fuselage. Since each of these tail surface units is alike in construction, and they are designed to be interchangeable, only one unit will be described in connection with Figs. 4 and 5.

Each of the tail surface units is formed from a single blank of metal which is bent, as indicated at 41, to provide a rounded leading edge from which a long side 42 and short side 43 extend rearwardly. The free end 44 of the short side 43 may be folded upon itself to form a reinforced edge. The short and long sides 43 and 42 are then brought together and are riveted or otherwise secured along the edge 44, as indicated at 45. This leaves protruding beyond the reinforced edge the directional control surface such as the rudder 37 or the elevator 39, which is of a single sheet of metal and is bendable by hand.

It will be noted from Fig. 5 that the rearwardly extending side portions 42 and 43 do not extend to the bottom of the blank, leaving bottom portions 46 and 47 of the blank which are bent outwardly at an angle to fit upon the fuselage, to which they are secured by screws or other means as indicated at 48. The tail surface units are thus mounted in operating position on the fuselage. It will be apparent that the protruding rudder and elevator portions may be bent at whatever angle the user desires for each particular flight intended, and in the event that these surfaces become distorted due to some accident, they are readily straightened into position without special tools. It will also be noted that there are no separate internal bracing or reinforcements in the tail surface units, although the same may be used if desired. Furthermore, with this construction, I can simulate true airfoil sections in the tail surfaces.

The mounting truss for the supporting wing 50 comprises a plate which is bent into substantially an inverted U-shape with a flat top portion 51 and depending legs 52 and 53, the latter arranged to be secured on each side of the fuselage. Both the top and side portions of the plate are provided with a plurality of lightening holes 54, which are stamped therein in such a way that any projecting edges around the holes will be on the interior of the truss when it is mounted in place. On each lower corner of the legs 52 and 53 is a hook 55 which opens downwardly. These hooks are properly secured to the legs by means of one or more rivets as indicated at 56. If the truss is to be mounted in fixed position on the fuselage, the rivets 56 may be used to mount the truss upon the fuselage as well as to hold the hooks 55 rigidly in place. However, I prefer to arrange the mounting of the bridge to be adjustable longitudinally of the fuselage for which purpose each of the legs 52 and 53 is provided with a pair of horizontally disposed slots 57 through which pass screws 58 arranged to hold the truss in fixed position on the fuselage. It will be apparent that by loosening the screws 58 the truss may be slid longitudinally of the fuselage and re-fixed in place in accordance with the desires of the assembler and to obtain the proper location of the wing.

No particular construction of wing 50 is described in this application because it is outside of the scope of the subject matter claimed herein. Any suitable wing having proper aerodynamic characteristics may be used.

For the purpose of mounting the wing, I have shown the same as provided with a flat plate 79 secured to the under surface of the wing at the center portion thereof. While this plate has been shown as a flat plate, it may take the same curvature as the under surface of the wing, and may even be fastened in place before the fabric or other covering is applied to form the wing.

The flat plate 79 coincides with the flat surface 51 of the truss when the wing is in place. Secured to the bottom of the plate near the front and rear edges thereof is a strip of flat stock 81, the ends of which are formed into depending hooks 82 which open upwardly and which are positioned substantially in vertical alignment with the hooks 55 on the lower portion of the mounting truss. When the wing is to be mounted in place the plate 79 rests upon the mounting truss 51 with the hooks substantially in the position shown in Fig. 1, and a strong elastic band 83 is used to secure the wing in position. The elastic band loops over one of the upper hooks 82, then beneath the lower hooks 55 and loops onto the other upper hook 82. This is repeated on the other side of the truss. Thus, there is at all times a firm downward pull exerted upon the wing holding it in position on the mounting truss. However, in the event of the wing being struck, such as in the portion on one side or the other of the fuselage, which might be due to encountering some object in flight for example, the elastic band provides sufficient give that neither the wing itself or the mounting therefor will be damaged. If the wing is out of position it is readily replaced. If the angle of incidence of the wing is to be changed, this can be done by inserting a block between the plate 79 and the front or rear end of the truss, or by tilting the truss by re-locating one of the screws 58.

Inasmuch as the undercarriage is the subject matter of the aforesaid application Serial No. 319,246, no detailed description thereof is made here. The member 93, attached to the fuselage near the forward end of the fuselage, carries at the lower end thereof a pair of landing wheels 98. At the rear end of the fuselage, a tail skid 86 is also mounted.

From the foregoing description it will be seen that I have provided construction in which the parts are readily assembled to form an airplane model capable of perfect flight results repeatedly notwithstanding unforeseen accidents in flight efforts, and that tedious labor on parts where small errors will spell the difference between a successful model and an unsuccessful one have been eliminated or reduced substantially, yet without destroying the educational value of model construction, or the practical value of the model.

Modifications may be made in the construction, arrangement and location of parts within the spirit and scope of my invention, and such modifications are intended to be covered by the appended claims.

I claim:

1. A model airplane comprising a fuselage, vertically and horizontally disposed rear control surface units mounted thereon, each control unit being self-supporting in its mounted position and being directly mounted on said fuselage, each control unit being formed from a metal blank folded to have a short side and a long side joined by a rounded leading edge, the short side being secured to the long side adjacent its free edge to leave the remainder of the long side projecting as a bendable control surface, and one edge of each of said sides being bent outwardly to form mounting flanges, and means securing the flanges to the fuselage.

2. A model airplane comprising a fuselage, vertically and horizontally disposed rear control surface units mounted thereon, each control unit being self-supporting in its mounted position and being directly mounted on said fuselage, each control unit being formed from a metal blank folded to have a short side and a long side joined by a rounded leading edge, the short side being folded to reinforce its free edge, means securing the same to the long side along its reinforced edge, the projecting portion of the long side serving as a bendable control surface, and one edge of each of said sides being bent outwardly to form mounting flanges, and means securing the flanges to the fuselage.

3. A model airplane comprising a fuselage, vertically and horizontally disposed rear control surface units mounted thereon, each control unit being self-supporting in its mounted position and being directly mounted on said fuselage, each control unit being an airfoil section somewhat triangular in shape and formed from a blank to have a rounded, enlarged leading edge, a short side and a long side tapering rearwardly therefrom, the short side being secured to the long side along its free edge and so as to close the airfoil section at the top and to leave a portion of the long side projecting rearwardly as a deflectable control surface, and the base of the unit being flanged outwardly to fit upon the fuselage, and means securing the same to the fuselage.

4. A model airplane comprising a fuselage, a supporting wing and means for mounting the wing in place, said means comprising a truss secured to the fuselage and having a flat surface above the fuselage, a pair of hooks on each side of the truss adjacent the front and rear edges thereof, a plate mounted on the under surface of the wing at the center thereof, a pair of hooks depending from the plate along each side edge thereof, and elastic bands respectively engaging the wing and truss hooks on each side of the fuselage so as to exert a downward pull on the wing.

5. A model airplane comprising a fuselage, a supporting wing, and means for mounting the wing in place, said means comprising a truss secured to the fuselage and extending above the fuselage, hooks on the truss on each side of the fuselage, hooks secured to and depending from the wing on each side of the fuselage, and elastic bands respectively engaging the wing and truss hooks so as to exert a downward pull on the wing.

6. A model airplane comprising a fuselage, a supporting wing, and means for mounting the wing in place, said means comprising a truss having a flat top overlying the fuselage and depending legs extending along opposite sides of the fuselage, means for securing the legs to the fuselage so that the truss can be adjusted longitudinally of the fuselage and fixed in the adjusted positions, and means for resiliently mounting the wing upon the truss.

HAROLD R. JOHNSON.

REFERENCES CITED

The following references are of record in the file of this patent:

UNITED STATES PATENTS

| Number | Name | Date |
| --- | --- | --- |
| 1,808,686 | Schultz | June 2, 1931 |
| 2,042,715 | Hunt | June 2, 1936 |
| 2,253,661 | Teuschler | Aug. 26, 1941 |
| 2,292,416 | Walker | Aug. 11, 1942 |

FOREIGN PATENTS

| Number | Country | Date |
| --- | --- | --- |
| 760,865 | France | Dec. 27, 1933 |